United States Patent [19]

Niessner et al.

[11] Patent Number: 5,336,718
[45] Date of Patent: Aug. 9, 1994

[54] IMPACT MODIFIER AND MOLDING MATERIAL CONTAINING IT

[75] Inventors: Norbert Niessner, Freidelsheim; Wolfgang Fischer, Ludwigshafen; Norbert Guentherberg, Speyer; Karl Ruppmich, Ludwigshafen; Friedrich Seitz, Friedelsheim, all of Fed. Rep. of Germany

[73] Assignee: BASF Aktiengesellschaft, Ludwigshafen, Fed. Rep. of Germany

[21] Appl. No.: 996,410

[22] Filed: Dec. 23, 1992

[30] Foreign Application Priority Data

Dec. 24, 1991 [DE] Fed. Rep. of Germany ....... 4142910

[51] Int. Cl.$^5$ .................. C08L 51/00; C08F 257/02; C08F 265/04
[52] U.S. Cl. .................................. 525/67; 525/73; 525/309
[58] Field of Search ........................... 525/309, 67, 73

[56] References Cited

U.S. PATENT DOCUMENTS

| | | |
|---|---|---|
| 3,657,172 | 4/1972 | Gallagher et al. |
| 3,733,338 | 5/1973 | Kimura et al. |
| 3,763,279 | 10/1973 | Kelley et al. |
| 3,971,835 | 7/1976 | Myers et al. |
| 4,082,895 | 4/1978 | Backderf et al. |
| 4,108,946 | 8/1978 | Kamada et al. |
| 4,513,118 | 4/1985 | Suetterlin et al. |
| 4,668,737 | 5/1987 | Eichenauer et al. |
| 4,764,563 | 8/1988 | Meredith et al. |
| 4,912,162 | 3/1990 | Kishida et al. |

FOREIGN PATENT DOCUMENTS

| | | |
|---|---|---|
| 770035 | 1/1972 | Belgium . |
| 783190 | 5/1972 | Belgium . |
| 231933 | 8/1987 | European Pat. Off. . |
| 290777 | 11/1988 | European Pat. Off. . |
| 450511 | 10/1991 | European Pat. Off. . |
| 2107350 | 9/1971 | Fed. Rep. of Germany . |
| 2244519 | 4/1973 | Fed. Rep. of Germany . |
| 2324316 | 1/1974 | Fed. Rep. of Germany . |
| 3300526 | 7/1984 | Fed. Rep. of Germany . |
| 3421353 | 12/1985 | Fed. Rep. of Germany . |
| 7528897 | 4/1977 | France . |

OTHER PUBLICATIONS

Derwent Publications, Ltd., AN 78–26084A (English–language abstract of JP 53 081 661). Feb. 1978.
JP 7023150–Chem Abstract Aug. 1970.
JP 147 460–Chem Abstract Aug. 1985.
JP 0069-154–Chem Abstract Apr. 1985.
JP 0063248–Chem Abstract Apr. 1985.

*Primary Examiner*—Vasu S. Jagannathan
*Attorney, Agent, or Firm*—Keil & Weinkauf

[57] ABSTRACT

A graft consisting of from 5 to 90% of a core A1 having a glass transition temperature above 25° C. made up of, from 50 to 99.9% of a vinylaromatic monomer and from 0.1 to 10% of a polyfunctional crosslinking and/or graft-linking monomer optionally up to 49.9% of one or more copolymerizable monomers; from 5 to 90% of a first shell A2 of elastomeric material made up of from 50 to 99.8% of an alkyl acrylate and/or of a diene, from 0.1 to 10% of a polyfunctional graft-linking monomer, up to 49.8% of one or more copolymerizable unsaturated monomers and from 0.1 to 10% of one or more monomers containing acidic groups; from 5 to 90% of a second shell A3 of rigid material made up of from 50 to 99.9% of a vinylaromatic monomer, up to 10% of a polyfunctional cross-linking and/or graft-linking monomer, up to 49.9% of one or more copolymerizable monomers and from 0.1 to 20% of a monomer containing one or more basic groups; and optionally up to 85% of a third shell A4 of a copolymer of, from 1 to 99% of one or more vinylaromatic monomers and from 1 to 99% of one or more copolymerizable monomers. The percentages are by weight and based, in the case of the monomers, on the core or shells to which they belong and, in the case of the core and shells A1–A4, on the sum of A1 to A4.

3 Claims, No Drawings

IMPACT MODIFIER AND MOLDING MATERIAL CONTAINING IT

The present invention relates to a multishell graft copolymer prepared by emulsion polymerization and its use for the preparation of mixtures which are suitable as molding materials.

Certain graft copolymers are used in particular as impact modifiers, for example for PVC, PMMA, etc., the graft copolymer in the form of particles being dispersed in a thermoplastic polymer.

Advantageously, the relevant known graft copolymers having a core/shell structure are 3-stage or multistage polymers consisting of a rigid core and a flexible first shell (or vice versa) and one or more further shells, the outermost shell generally being a rigid shell which is intended to establish (partial) compatibility with a thermoplastic matrix.

The terms rigid and flexible refer to the position of the glass transition temperature Tg of the corresponding homopolymers (above or below room temperature).

The core/shell structure, in particular in the case of the PVC and PMMA modifiers, serves for partial or complete compensation of the difference between the refractive index of the disperse rubber phase and that of the continuous thermoplastic rigid matrix. This results in both tough and transparent thermoplastic materials.

Among the graft copolymers, those without unsaturated components have particularly good stability to weathering. These are in particular acrylate rubbers. Crosslinking and/or graft-linking monomers on the one hand ensure elastomeric behavior of these acrylate rubbers and on the other hand permit the binding of further shells to the rubber base. A detailed discussion of optically transparent multiphase systems appears in: H. J. Biangardi, H. Sturm and G. Kostersitz, Angew. Makromol. Chem. 183 (1990), 221–241.

In order to increase the physically effective rubber volume without increasing the effective amount of rubber, a rigid component must be enclosed in the rubber particles. This concept forms a basis of the development of high impact polystyrene or of ABS plastics (for example, described in Rubber Toughened Plastics, Advances in Chemistry Series (1989) 222, page 2). This means that, in the case of an emulsion polymer, a rigid core must be enclosed by a flexible first shell, which then has a further, second shell compatible with the continuous thermoplastic matrix.

DE-A-2 107 350 and BE-A-783 190 describe multilayer emulsion copolymers having rigid/flexible morphology. However, the outer, rigid shell is produced not in a controlled manner by emulsion polymerization but by suspension polymerization. These particles permit good toughening.

BE-A-770 035, DE-A-2 244 519 and U.S. Pat. No. 3,971,835 describe systems comprising rigid styrene cores, a first shell of butyl acrylate rubber and a second shell of MMA for toughening PVC.

JA-A-7 023 150 proposes a system comprising a styrene core, a first shell of a crosslinked alkyl acrylate and a second shell of, for example, a mixture of styrene and acrylonitrile for toughening PVC.

FR-A-2 324 660 describes a system comprising an uncrosslinked polystyrene-co-MMA core and an uncrosslinked rubber-like shell of alkyl acrylate+-styrene/acrylonitrile, as processing assistant for PVC molding materials.

U.S. Pat. No. 4,082,895 recommends graft copolymers comprising an acrylonitrile copolymer as the core, a first shell of crosslinked acrylate rubber and an outer shell of, for example, styrene/acrylonitrile. The disadvantage here is the yellowing which occurs at high acrylonitrile content.

PMMA modifiers comprising a rigid core, an elastomeric first shell and a second shell of at least 80% of MMA are described in DE-A-3 300 526.

DE-A-23 24 316 describes a multishell acrylate rubber comprising a rigid, crosslinked core, a first shell of acrylate and a second shell of, for example, a styrene/acrylonitrile copolymer.

JA-A-85 063 248, 85 069 154 and 85 147 460 describe graft copolymers having a rigid core of, for example, polystyrene, a first shell of, for example, butyl acrylate and an outer shell, for example a styrene copolymer. These graft copolymers have excellent stability to weathering and in general good transparency; however, their toughening effect is only satisfactory but not good.

A principal problem in the preparation of such particulate graft polymers is the binding of the graft to the grafting base. If binding is poor, the toughening effect is not sufficient, so that only products having reduced toughness may be obtained. A number of measures have been proposed for improving the binding, of which only the use of graft-linking or graft-enhancing monomers in the preparation of the grafting base is mentioned here (for example U.S. Pat. No. 4,764,563 and EP-A-231 933).

According to a definition given in EP-A-231 933, graft-linking monomers differ from crosslinking monomers in that the graft-linking monomers contain two or more polymerizable double bonds which differ substantially in their reactivity with regard to the polymerization, while the double bonds of crosslinking monomers have almost the same reactivity. However, it is known that such a sharp distinction is not generally possible because some of the less reactive double bonds of the graft-linking monomers also react during the preparation of the grafting base and hence lead to increased crosslinking of the grafting base. They are therefore no longer available for graft reactions. On the other hand, the proportion of the graft-linking monomers in the grafting base cannot be increased without limit because their crosslinking effect leads to embrittlement of the elastomeric polymer used as the grafting base.

It is known per se (cf. DE-A 34 21 353) that both acidic and at the same time basic monomers can be used in the graft of a rubber component; this is intended to produce polymers having a dull surface. The effect of simultaneously using an acidic monomer and a base to achieve substantially better notched impact strength has been described in EP-A-450 511, but not in connection with a core/shell structure.

The present invention directly relates to a graft copolymer consisting of, in the order of A1 to A4 from inside to outside and based in each case on the sum of A1 to A4, A1: from 5 to 90% by weight of a core having a glass transition temperature Tg above 25° C. and consisting of, based on A1, A11: from 50 to 99.9% by weight of a vinylaromatic monomer, A12: from 0.1 to 10% by weight of a polyfunctional crosslinking monomer and/or a graft-linking monomer having two or more functional groups of different reactivities, where the crosslinking and graft-linking effects may apply to a single monomer, and A13: up to 49.9% by weight of one or more copolymerizable monomers, A2: from 5 to 90% by weight of a first shell of elastomeric material having a glass transition temperature $T_g$ below 10° C. and consisting of, based on A2, A21: from 50 to 99.8% by weight of an alkyl acrylate where the alkyl radical is of 1 to 18 carbon atoms and/or of a diene, A22: from 0.1 to 10% by weight of a polyfunctional crosslinking monomer and/or of at least one graft-linking monomer having two or more functional groups of different reactivities, where the crosslinking and graft-linking effects may apply to a single monomer, A23: from 0 to 49.8% by weight of one or more copolymerizable unsaturated monomers and A24: from 0.1 to 10% by weight of one or more monomers containing acidic groups, A3: from 5 to 90% by weight of a second shell of rigid material having a glass transition temperature $T_g$ above 25° C. and consisting of, based on A3, A31: from 50 to 99.9% by weight of a vinylaromatic monomer, A32: up to 10% by weight of a polyfunctional crosslinking monomer and/or of at least one graft-linking monomer having two or more functional groups of different reactivities, A33: up to 49.9% by weight of one or more copolymerizable monomers and A34: from 0.1 to 20% by weight of a monomer containing one or more basic groups, and A4: up to 85% by weight of a third shell of a copolymer of, based on A4, A41: from 1 to 99% by weight of one or more vinylaromatic monomers and A42: from 1 to 99% by weight of one or more copolymerizable monomers and its use for the preparation of blends, i.e. the toughening of rigid, thermoplastic polymers.

The essential part of the present invention is the knowledge that the binding of the graft (A3) to the grafting base (A2) can be substantially improved if the grafting base (A2) is a polymer which contains, as polymerized units, either from 50 to 99.8% by weight of an alkyl acrylate (A21) where the alkyl radical is of 1 to 18 carbon atoms or of at least one diene, from 0.1 to 10% by weight of a polyfunctional, crosslinking monomer and/or of at least one graft-linking monomer (A22) and from 0.1 to 10% by weight of a monomer (A24) containing at least one acidic group and up to 49.8% by weight of at least one further ethylenically unsaturated monomer (A23), onto which a monomer mixture of from 50 to 99.9% by weight of a vinylaromatic monomer (A31), from 10 to 49.9% by weight of at least one copolymerizable, ethylenically unsaturated monomer (A33), from 0.1 to 10% by weight of at least one monomer (A34) containing basic groups and up to 10% by weight of at least one polyfunctional, crosslinking monomer and/or of at least one graft-linking monomer (A32) is grafted as the graft (A3). This results in higher notched impact strength and in a lower dependence of the notched impact strength on the processing temperature during injection molding. The components A24 and A34 may also be interchanged. In the event of interchanging, the ratios of the other components should be treated as described above or below and if necessary adapted.

The novel graft polymers A preferably contain from 10 to 50% by weight of A1, from 20 to 60% by weight of A2, from 20 to 60% by weight of A3 and from 10 to 30% by weight of A4; the amounts of the individual monomers, based in each case on A1, A2, A3 or A4, should preferably be:

A11: from 70 to 99.5% by weight
A12: from 0.5 to 5% by weight
A13: up to 29.5% by weight
A21: from 70 to 99% by weight
A22: from 0.5 to 5% by weight
A23: up to 29.3% by weight
A24: from 0.2 to 5% by weight
A31: from 65 to 99% by weight
A32: up to 5% by weight
A33: up to 40% by weight
A34: from 0.2 to 10% by weight.
A41: from 10 to 90% by weight
A42: from 10 to 90% by weight Component A Grafting base A1

The particulate graft copolymers having a core/shell structure are first prepared in a conventional manner from a grafting base A1 and from shells A2, A3 and A4 grafted in succession thereon. The grafting base is most advantageously prepared in aqueous emulsion at from 20° to 100° C. preferably from 40° to 80° C. For this purpose, vinylaromatic monomer(s) A11 and crosslinking, polyfunctional monomers and/or graft-linking monomers A12 are polymerized with or without further ethylenically unsaturated copolymerizable monomers A13. Crosslinking and graft-linking properties may apply to a single monomer.

Examples of vinylaromatic monomers are styrene, alpha-methylstyrene and styrenes alkylated in the nucleus, such as p-methylstyrene and tert-butylstyrene. Styrene, alpha-methylstyrene and p-methylstyrene are particularly preferably used, alone or as a mixture. Examples of other copolymerizable ethylenically unsaturated monomers are acrylonitrile, acrylic acid, maleic anhydride, acrylamide, N-substituted acrylamides, vinyl methyl ether and $C_1$-$C_8$-alkyl (meth)acrylates, individually or as a mixture.

To obtain good mechanical properties, it has proven necessary both for the polymer used as the grafting base to be crosslinked and for there to be graftlinking sites for the subsequent grafting. For this purpose, the polymerization is carried out in the presence of from 0.1 to 10, preferably from 0.5 to 5, % by weight, based on the total weight of the monomers A12 used in the preparation of the grafting base. In particular, the crosslinking agents used simultaneously act as graft-linking monomers; alternatively, graft-linking monomers may be added in amounts of from 0.1 to 10% by weight, in addition to the monomers which are crosslinking and may be graft-linking. Crosslinking agents include divinylbenzene, diallyl maleate, diallyl fumarate, diallyl phthalate, triallyl cyanurate and triallyl isocyanurate. Graft-linking monomers are unsaturated monomers which carry epoxy, hydroxyl, carboxyl, amino or anhydride groups, for example hydroxyalkyl (meth)acrylates. Dicyclopentadienyl acrylate and the ester of acrylic acid with tricyclodecenyl alcohol have proven particularly advantageous crosslinking agents and graft-linking monomers (cf. DE-A-12 60 135).

The glass transition temperature of the grafting base A1 is above 25° C. preferably 50° C. (The glass transition temperature is determined, for example, with the aid of DSC; K. H. Illere, Makromol. Chem. 127 (1969)).

The usual emulsifiers, such as alkali salts of alkyl- or alkylarylsulfonic acids, alkylsulfates, fatty alcohol sulfonates, salts of higher fatty acids of 10 to 30 carbon atoms or resin soaps, may be used. Sodium salts of alkylsulfonates or of fatty acids of 10 to 18 carbon atoms are preferably used. Emulsifiers are preferably used in amounts of from 0.5 to 5% by weight, based on the total weight of the monomers used for the preparation of the grafting base A1. In particular, the conventional persulfates are used as polymerization initiators, but redox systems are also suitable. The amount of initiators (for example from 0.1 to 1% by weight) depends in a known manner on the desired molecular weight.

The conventional buffer substances, such as sodium bicarbonate or sodium pyrophosphate (with which a pH of from 6 to 9 can be obtained), and molecular weight regulators, for example mercaptans, terpinols or dimeric alpha-methylstyrene, can be used as polymerization assistants.

The exact polymerization conditions, in particular the type, metering and amount of the emulsifier, are determined individually within the abovementioned ranges so that the resulting latex of the crosslinked polymer has a particle size ($d_{50}$ value) of from about 30 to 1,000 nm, preferably from 50 to 800 nm.

In principle, it is also possible to prepare the grafting base by a method other than that of emulsion polymerization, for example by mass or solution polymerization, and to emulsify the resulting polymers subsequently. The processes for this purpose are known.

Graft A2

To graft the first shell A2 onto the core A1, at least one alkyl acrylate A21 where the alkyl radical is of 1 to 18 carbon atoms (if necessary with further copolymerizable monomers A23) or at least one diene is polymerized in the presence of the grafting base A1 and in the presence of crosslinking or graft-linking monomers A22 and of at least one monomer carrying one or more acidic groups.

Suitable monomers A21 are alkyl acrylates which form rubber elastomers and in which the alkyl radical is of not more than 18, in particular from 2 to 8, carbon atoms, alone or as a mixture. n-Butyl acrylate and ethylhexyl acrylate are particularly suitable.

The statements made for the crosslinking and/or graft-linking monomers A12 are also applicable to A22. Where dienes, e.g. butadiene, isoprene or derivatives thereof, are used as monomers A21, the monomers which are crosslinking and/or graft-linking according to the invention may of course also be butadiene, isoprene and derivatives thereof. In a preferred embodiment, the graft A2 consists of from 90 to 99.9% by weight of butadiene and from 0.1 to 10% by weight of (meth)acrylic acid. Further copolymerizable monomers A23 comprise the monomers stated under A11 and A13.

Other suitable monomers A21 are dienes, such as butadiene, isoprene and derivatives thereof.

To improve the binding of the graft A3 to the grafting base A2, the monomer mixture used for the preparation of the grafting base furthermore contains from 0.1 to 10, preferably from 0.2 to 5, % by weight of one or more monomers which contain one or more acidic groups (A24). Particularly suitable acidic groups are carboxyl or sulfo groups. Preferred acidic monomers A24 are alpha, beta-unsaturated carboxylic acids, such as acrylic acid or methacrylic acid, as well as crotonic acid, fumaric acid, iraconic acid, maleic acid, vinylsulfonic acid, vinylbenzenesulfonic acid or cinnamic acid.

The glass transition temperature of the graft A2 is below 10° C. preferably below 0° C.

It is advantageous to carry out the graft copolymerization onto the polymer A1 serving as the grafting base once again in aqueous emulsion. It may be effected in the same system as the polymerization of the grafting base, and further emulsifier and initiator may be added. These may not be identical to the emulsifiers or initiators used for the preparation of A1. The emulsifier, initiator and polymerization assistants may each be initially taken, alone or as a mixture, with the emulsion of the grafting base A1. However, they can also be added alone or as a mixture together with the monomer(s) used for the first shell A2. For example, the initiator and a buffer substance as a polymerization assistant can be initially taken with the emulsion of the grafting base, and the monomers for the shell can then be added dropwise together with the emulsifier. Any possible combination of initial introduction and feed on the one hand and initiator, emulsifier and polymerization assistant on the other hand is suitable. Suitable processes are known, for example also from Houben-Weyl, Polymere I, page 219 et seq. Otherwise, the statements made in connection with the preparation of the grafting base are applicable to the choice of emulsifier, initiator and polymerization assistants.

Graft A3

For the preparation of the graft copolymer from the core and graft, a toohomer mixture of from 50 to 99.9% by weight of at least one vinylaromatic toohomer A31, up to 49.9% by weight of at least one copolymerizable toohomer A33, up to 10% by weight of at least one polyfunctional crosslinking and/or graft-linking monomer A3 and from 0.1 to 20% by weight of at least one basic monomer A34 is polymerized in the presence of the resulting latex A1+A2.

The compounds described for the grafting base A1 are used as vinylaromatic monomers, as polyfunctional, crosslinking monomers, as graft-linking monomers and as further ethylenically unsaturated copolymerizable monomers.

Suitable basic monomers A34 are monomers which are copolymerizable with A31, A32 and A33 and which contain at least one basic group in the molecule. Preferred monomers A34 contain a tertiary amino group or heteroaromatically bonded nitrogen in the molecule. Examples here are N,N-dimethylaminoethyl (meth)acrylate, morpholine methacrylate, N-vinylimidazole, p-dimethylaminostyrene, N-vinylcarbazole, N-vinylindole, N-vinylpyrrole, 4-vinylpyrimidine, 2-vinylpyridine, 3-vinylpyridine, 4-vinylpyridine and mixtures thereof. Particularly preferred monomers are esters of acrylic acid or methacrylic acid with aliphatic alcohols which contain a tertiary amino group in the alkyl radical. Examples are dimethylaminoethyl acrylate and methacrylate. Preferred monomer mixtures contain from 65 to 99 (from 70 to 79.5) % by weight of styrene and/or alpha-methylstyrene, up to 40 (from 20 to 35) % by weight of acrylonitrile and from 0.2 to 10 (from 0.5 to 5) % by weight of the basic compound, dimethylaminoethyl acrylate being preferred.

The glass transition temperature of the graft A3 is above 25° C., preferably above 50° C.

It is advantageous to carry out the graft copolymerization onto the polymer A1+A2 serving as grafting base once again in aqueous emulsion. It may be effected in the same system as the polymerization of the grafting base A1+A2, and further emulsifier and initiator may be added. These need not be identical to the emulsifiers or initiators used for the preparation of A1 and/or A2. Otherwise, the statements made in connection with the preparation of the grafting base and of the first shell are applicable to the choice and combination of emulsifier, initiator and polymerization assistants.

Graft A4

The compounds described above are used as vinylaromatic monomers and as further ethylenically unsaturated copolymerizable monomers.

The graft copolymerization of the third shell is once again advantageously carried out in aqueous emulsion. It may be effected in the same system as the polymerization of the grafting base A1+A2+A3, and further emulsifier and initiator may be added. These need not be identical to the previously used emulsifiers or initiators. Otherwise, the statements made in connection with the preparation of the grafting base and first shell are applicable to the choice and combination of emulsifier, initiator and polymerization assistants.

Molding material component B

Component B may be either polyvinyl chloride (B) or at least one copolymer B. Preferred copolymers B are those of at least one monomer B1 from the series consisting of styrene, α-methylstyrene, styrene substituted in the nucleus, such as p-methylstyrene and alkyl (meth)acrylate with at least one monomer B2 from the series consisting of acrylonitrile, methacrylonitrile, maleic anhydride, alkyl (meth)acrylate, N-substituted maleimide and mixtures thereof. Component B is used in an amount of from 5 to 95, preferably from 20 to 90, % by weight, based on the sum of A, B and C.

Copolymers B are frequently formed as byproducts in the graft polymerization for the preparation of component A, particularly when large amounts of monomers are grafted onto small amounts of rubber.

The copolymers B are resin-like, thermoplastic and rubber-free. Particularly preferred copolymers B are those of styrene and acrylonitrile and, if required, with methyl methacrylate, of α-methylstyrene with acrylonitrile and, if required, with methyl methacrylate or of styrene and α-methylstyrene with acrylonitrile and, if required, with methyl methacrylate and of styrene and maleic anhydride.

Weight ratios in the thermoplastic copolymer B are preferably from 50 to 90, particularly preferably from 60 to 80, % by weight of B1 and preferably from 10 to 50, particularly preferably from 40 to 20, % by weight of B2. A plurality of the copolymers described may furthermore be used simultaneously.

Copolymers B are known and can be prepared by free radical polymerization, in particular by emulsion, suspension, solution or mass polymerization. They have viscosity numbers of from 40 to 160, preferably from 60 to 100 (ml/g), corresponding to molecular weights $\overline{M}_w$ of from 15,000 to 200,000.

Component C

Thermoplastic, aromatic polycarbonates C which are suitable according to the invention are those based on diphenols of the formula (I)

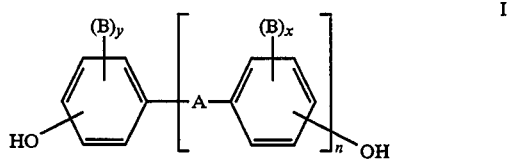

where A is a single bond, $C_1$–$C_5$-alkylene, $C_2$–$C_5$-alkylidene, $C_2$–$C_6$-cycloalkylidene, —S— or —SO$_2$—, B is chlorine, bromine or $C_1$–$C_8$—alkyl, x and y independently of one another are each 0, 1 or 2 and n is 1 or 0.

Polycarbonates C which are suitable according to the invention are both homopolycarbonates and copolycarbonates. They are used in amounts of up to 90, preferably up to 70, % by weight, based on the sum of A+B+C.

The diphenols of the formula (I) are either known from the literature or can be prepared by processes known from the literature.

The preparation of the polycarbonates C which are suitable according to the invention is known and can be carried out, for example, with phosgene by the phase boundary method or with phosgene by the method in the homogeneous phase (i.e. the pyridine method), the molecular weight to be obtained in each case being achieved in a known manner by means of a corresponding amount of known chain terminators. (Regarding polydiorganosiloxane-containing polycarbonates, see, for example, German Laid-Open Application DOS 3,334,782).

Examples of suitable chain terminators are phenol, p-chlorophenol, p-tert-butylphenol and 2,4,6-tribromophenol, as well as long-chain alkylphenols, such as 4-(1,3-tetramethylbutyl)-phenol according to German Laid-Open Application DOS 2,842,005, or monoalkylphenols or dialkylphenols where the alkyl substituents have a total of 8 to 20 carbon atoms, according to German Patent Application P 35 06 472.2 (Le A 23 654), such as p-nonylphenol, 3,5-di-tert-butylphenol, p-tert-octylphenol, p-dodecylphenol, 2-(3,5-dimethylheptyl)-phenol, 4-(3,5-dimethylheptyl)-phenol and 4-(3,5-dimethylheptyl)-phenol.

The polycarbonates C which are suitable according to the invention have a weight average molecular weight ($\overline{M}_w$, measured, for example, by means of an ultracentrifuge or scattered light) of from 10,000 to 200,000, preferably from 20,000 to 80,000. Suitable diphenols of the formula (I) are, for example, hydroquinone, resorcinol, 4,4'-dihydroxybiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)propane, 2,2-bis-(3,5-dibromo-4-hydroxyphenyl)-propane and 2,2-bis-(3,5-dimethyl-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane, 2,2-bis-(3,5-dimethyl-4-hydroxyphenyl)-propane and 1,1-bis-(4-hydroxyphenyl)-cyclohexane.

The polycarbonates C which are suitable according to the invention may be branched in the known manner, preferably by the incorporation of from 0.05 to 2.0 mol, based on the sum of the diphenols used, of compounds which are trifunctional or more than trifunctional, for example those having three or more phenolic OH groups.

Preferred polycarbonates in addition to bisphenol A homopolycarbonate are the copolycarbonates of bisphenol A with up to 15 mol %, based on the total number of moles of diphenols, of 2,2-bis-(3,5-dibromo-4-hydroxyphenyl)propane.

The novel particulate graft polymers A can be used alone as molding materials. For this purpose, they may be worked up, for example, by spray drying. However, the particulate graft polymers are preferably used for blending with a thermoplastic in order to increase its impact strength. Thermoplastics which are suitable for modification have a glass transition temperature above 25° C. preferably above 60° C. particularly preferably above 80° C. They are also referred to below as the rigid component (matrix). Examples of suitable rigid components are polyvinyl chloride, polymethyl methacrylate and in particular copolymers of vinylaromatic monomers and polar, copolymerizable, ethylenically unsaturated monomers. Suitable vinylaromatic and polar, copolymerizable, ethylenically unsaturated monomers here are also those mentioned as A31 and A33 for the preparation of the graft A3. Particularly preferred rigid components are styrene/acrylonitrile and α-methylstyrene/acrylonitrile copolymers. The novel particulate graft polymers may be incorporated, for example, by isolating the particulate graft polymer from the emulsion by adding an electrolyte and then, if necessary after drying, mixing it with the rigid component by extrusion, kneading or treatment in a roll mill.

The novel thermoplastic molding materials may contain, as further components, additives as usually used for thermoplastic molding materials. Examples of these are fillers, further, compatible plastics, antistatic agents, antioxidants, flameproofing agents, lubricants, dyes and pigments. The additives are used in conventional amounts, preferably in amounts of from 0.1 to 30% by weight, based on the total weight of the thermoplastic molding material. Compatible plastics may also account for a higher proportion.

The novel molding materials can be converted into moldings, for example window profiles, garden furniture, boats, signs, lamp coverings, automotive parts and children's toys, by the methods usually used for processing thermoplastics, for example extrusion and injection molding. The materials according to the invention are particularly suitable for the production of moldings where high impact strength is required in conjunction with good resistance to weathering and to ageing.

The parameters used below for characterization were determined as follows:

The stated average particle size in all cases is the weight average particle size as determined by means of an analytical ultracentrifuge by the method of W. Scholtan and H. Lange, Kolloid-Z. und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size. The median particle diameter, which is also referred to as the $d_{50}$ value of the integral mass distribution, is defined as the value at which 50% by weight of the particles have a smaller diameter than the $d_{50}$ value and 50% of the particles have a larger diameter than the $d_{50}$ value.

The viscosity number [$cm^3/g$] was determined in a 0.5% strength solution in dimethylformamide at 23° C. Insoluble gel constituents were removed before the measurement by centrifuging, and the sample weight was corrected accordingly.

EXAMPLES

For the preparation of the blends, a commercial styrene/acrylonitrile copolymer having an acrylonitrile content of 35% and a viscosity number of 80 ml/g was used as copolymer B. The precipitated and dried graft copolymer A was mixed with component B in an extruder at 260° C. in such a way that the resulting mixture contained 50% of A. Moldings were produced from this mixture by injection molding.

EXAMPLE 1 cf. Table 1

Preparation of a 3-stage graft copolymer with dicyclopentadienyl acrylate as the crosslinking agent, methacrylic acid in the first shell and N-vinylimidazole in the second shell.

1 Preparation of grafting base A1

4,200 g of water, 6 g of the sodium salt of a $C_{18}$-paraffinsulfonic acid, 2 g of potassium peroxodisulfate, 3 g of sodium bicarbonate and 1.5 g of sodium pyrophosphate were heated to 60° C. while stirring. A mixture of 588 g of styrene and 12 g of dicyclopentadienyl acrylate was added in the course of 3 hours. Solids content: 12.7%; pH: 8.1; particle diameter $d_{50}$: 83 nm.

Preparation of the first shell A2

24 g of the sodium salt of a $C_{12}$–$C_{18}$-paraffinsulfonic acid, 7.2 g of potassium peroxodisulfate, 6 g of sodium bicarbonate and 3 g of sodium pyrophosphate were added dropwise to the emulsion described above at 60° C. in the course of 2.5 hours. At the same time, 2,400 g of a mixture of 98 parts of n-butyl acrylate and 1 part of dicyclopentadienyl acrylate and 1 part of methacrylic acid were added dropwise in the course of 2.5 hours. Stirring was continued for 2 hours at 60° C. Solids content: 42.1%; pH: 8.4; particle diameter $d_{50}$: 126 nm.

Preparation of the second shell A3

4,800 g of the emulsion obtained as above, 1,900 g of water and 5 g of potassium peroxodisulfate were heated to 60° C. while stirring. 940 g of styrene, 314 g of acrylonitrile and 26 g of N-vinylimidazole were metered in over 1 hour and stirring was continued for 30 minutes. Solids content: 41.4%; pH: 8.4; particle diameter $d_{50}$: 0:162 nm.

COMPARATIVE EXPERIMENT 1

Preparation of a 3-stage graft copolymer with butanediol diacrylate and dicyclopentadienyl acrylate as a crosslinking agent, without the use of an acidic or basic comonomer.

Preparation of a grafting base 4,200 g of water, 6 g of the sodium salt of a $C_{12}$–$C_{18}$-paraffinsulfonic acid, 2 g of potassium peroxodisulfate, 3 g of sodium bicarbonate and 1.5 g of sodium pyrophosphate were heated to 60° C. while stirring. A mixture of 588 g of styrene and 12 g of dicyclopentadienyl acrylate was added in the course of 3 hours. Solid. content: 12.7%; pH: 8.1; particle diameter $d_{50}$: 82nm.

Preparation of a first shell 24 g of the sodium salt of a $C_{12}$–$C_{18}$-paraffinsulfonic acid, 7.2 g of potassium peroxodisulfate, 6 g of sodium bicarbonate and 3 g of sodium pyrophosphate were added dropwise to the emulsion described above at 60° C. in the course of 2.5 hours. At the same time, 2,400 g of a mixture of 98 parts of n-butyl acrylate and 2 parts of tricyclodecenyl acrylate were added dropwise in the course of 2.5 hours. Stirring was continued for 2 hours at 60° C. Solids content: 42.1%; pH: 8.3; particle diameter $d_{50}$: 151 nm.

Preparation of a second shell 4,800 g of the emulsion obtained as above, 1,900 g of water and 5 g of potassium peroxodisulfate were heated to 60° C. while stirring. 960 g of styrene and 320 g of acrylonitrile were metered in over 1 hour. Stirring was continued for a further 30 minutes. Solids content: 41.4%; pH: 8.4; particle diameter $d_{50}$: 180 nm.

COMPARATIVE EXPERIMENT 2

Preparation of a 2-stage graft copolymer with dicyclopentadienyl acrylate as a crosslinking agent Preparation of a grafting base 4,200 g of water, 30 g of the sodium salt of a $C_{12}$–$C_{18}$-paraffinsulfonic acid, 9.2 g of potassium peroxodisulfate, 9 g of sodium bicarbonate and 4.5 g of sodium pyrophosphate were heated to 60° C. while stirring. A mixture of 2,940 g of n-butyl acrylate and 60 g of dicyclopentadienyl acrylate was added in the course of 3 hours. Solids content: 42.1%; pH: 8.1; particle diameter $d_{50}$: 148 nm.

Preparation of a shell 4,800 g of the emulsion obtained as above, 1,900 g of water and 5 g of potassium peroxodisulfate were heated to 65° C. while stirring. 960 g of styrene and 320 g of acrylonitrile were metered in over 1 hour and stirring was continued for a further 30 minutes. Solids content: 41.4%; pH: 8.2; particle diameter $d_{50}$: 180 nm.

TABLE 1

Blend of a graft rubber A with a styrene/acrylonitrile copolymer B in the ratio 1:1 Notched impact strength $a_K$ in $kJ/m^2$ by the DIN 53453 method at various injection molding temperatures

| | Injection molding temperature | | | |
| --- | --- | --- | --- | --- |
| | 220° C. | 250° C. | 280° C. | 280° C. |
| Temperature of measurement | 23° C. | 23° C. | 23° C. | 0° C. |
| Example 1 | 27.6 | 29.8 | 30.7 | 7.7 |
| Comparative experiment 1 | 19.7 | 28.3 | 30.9 | 5.6 |
| Comparative experiment 2 | 7.9 | 19.6 | 23.1 | 7.0 |

We claim:

1. A graft copolymer A consisting of, in the order of A1 to A4 from inside to outside and based in each case on the sum of A1 to A4,

- A1: from 5 to 90% by weight of a core having a glass transition temperature $T_g$ above 25° C. and consisting of, based on A1,
  - A11: from 50 to 99.9% by weight of a vinylaromatic monomer,
  - A12: from 0.1 to 10% by weight of a polyfunctional crosslinking monomer or a graft-linking monomer having two or more functional groups of different reactivities, where the crosslinking and graft-linking apply to a single monomer, and
  - A13: up to 49.9% by weight of one or more copolymerizable ethylenically unsaturated monomers,
- A2: from 5 to 90% by weight of a first shell of elastomeric material having a glass transition temperature $T_g$ below 10° C. and consisting of, based on A2,
  - A21: from 50 to 99.8% by weight of an alkyl acrylate where the alkyl radical is of 1 to 18 carbon atoms or of a diene,
  - A22: from 0.1 to 10% by weight of a polyfunctional crosslinking monomer or of at least one graft-linking monomer having two or more functional groups of different reactivities, where the crosslinking and graft-linking apply to a single monomer,
  - A23: from 0 to 49.8% by weight of one or more copolymerizable unsaturated monomers and
  - A24: from 0.1 to 10% by weight of one or more $\alpha,\beta$-unsaturated monomers containing carboxylic, vinylsulfonic, vinylbenzenesulfonic, or cinnamic acidic groups,
- A3: from 5 to 90% by weight of a second shell of rigid material having a glass transition temperature $T_g$ above 25° C. and consisting of, based on A3,
  - A31: from 50 to 99.9% by weight of a vinylaromatic monomer,
  - A32: up to 10% by weight of a polyfunctional cross-linking monomer or of at least one graft-linking monomer having two or more functional groups of different reactivities,
  - A33: up to 49.9% by weight of one or more copolymerizable ethylenically unsaturated monomers and
  - A34: from 0.1 to 20% by weight of an unsaturated monomer containing one or more basic groups containing a tertiary amino group or a heteroaromatically bonded nitrogen in the molecule, and
- A4: up to 85% by weight of a third shell of a copolymer of, based on A4,
  - A41: from 1 to 99% by weight of one or more vinylaromatic monomers and
  - A42: from 1 to 99% by weight of one or more copolymerizable ethylenically unsaturated monomers.

2. A graft copolymer as claimed in claim 1, containing, as component A24, from 0.1 to 20% by weight, based on A2, of a monomer containing one or more basic groups and, as component A34, from 0.1 to 10% by weight of a monomer containing one or more acidic groups.

3. A thermoplastic molding material containing, based on the sum of A, B and C,

- A: from 5 to 95% by weight of a graft copolymer A as claimed in claim 1,
- B: from 95 to 5% by weight of polyvinyl chloride or of at least one copolymer (B) of, based on B,
  - B1: from 50 to 90% by weight of styrene, alpha-alkylstyrene, styrene substituted in the nucleus, alkyl (meth)acrylate where the alkyl radical is 1 to 18 carbon atoms or a mixture thereof (B1) and
  - B2: from 10 to 50% by weight of (meth)acrylonitrile, maleic anhydride, alkyl (meth)-acrylate, N-substituted maleimide or a mixture thereof (B2),
- C: up to 90% by weight of at least one polycarbonate C and
- D: up to 100% by weight, based on the mixture of A, B and C, of conventional additives.

* * * * *

UNITED STATES PATENT AND TRADEMARK OFFICE
CERTIFICATE OF CORRECTION

PATENT NO.: 5,336,718

DATED: August 9, 1994

INVENTOR(S): NIESSNER et al.

It is certified that error appears in the above-identified patent and that said Letters Patent is hereby corrected as shown below:

In the Abstract, line 1, after "A graft" insert --copolymer--.

Signed and Sealed this

Eleventh Day of October, 1994

Attest:

BRUCE LEHMAN

*Attesting Officer*          *Commissioner of Patents and Trademarks*